United States Patent [19]

Brodmann

[11] Patent Number: 4,470,252
[45] Date of Patent: Sep. 11, 1984

[54] PROCESS FOR PRODUCING TREATED GLASS FIBER STRANDS FOR HIGH SPEED BULKING

[75] Inventor: George L. Brodmann, Gibsonia, Pa.

[73] Assignee: PPG Industries, Inc., Pittsburgh, Pa.

[21] Appl. No.: 481,549

[22] Filed: Apr. 4, 1983

[51] Int. Cl.³ .................... C03C 25/02; C08L 3/02; D02G 3/18
[52] U.S. Cl. ......................... 57/309; 28/178; 28/271; 57/249; 57/250; 57/295; 57/313; 65/3.1; 65/3.44; 428/375; 428/378; 428/391; 428/392
[58] Field of Search .................. 57/295-297, 57/309, 350, 313, 246, 249, 258, 90, 240, 241, 242, 250, 251, 257; 428/369, 375, 378, 392, 391, 396; 106/211, 212; 28/247, 271, 254, 212, 178; 65/2, 3.1, 3.43, 3.44; 156/148; 242/18 G

[56]  References Cited
U.S. PATENT DOCUMENTS

| | | | |
|---|---|---|---|
| 1,758,622 | 5/1930 | Rindge | 57/258 X |
| 2,807,862 | 10/1957 | Griset, Jr. | 28/254 |
| 2,829,420 | 4/1958 | Griset, Jr. | 28/254 |
| 2,874,443 | 2/1959 | Griset, Jr. | 28/254 |
| 2,874,444 | 2/1959 | Griset, Jr. | 28/254 |
| 3,166,441 | 1/1965 | Rylka | 118/325 |
| 3,227,192 | 1/1966 | Griffiths | 428/392 X |
| 3,281,223 | 10/1966 | Simison | 65/3.1 |
| 3,339,357 | 9/1967 | Marzocchi et al. | 57/296 |
| 3,461,090 | 8/1969 | Haynes et al. | 428/375 |
| 3,472,682 | 10/1969 | Rammel et al. | 428/378 |
| 3,472,717 | 10/1969 | Kim | 156/148 |
| 3,488,670 | 1/1970 | Benson | 28/271 |
| 3,664,855 | 5/1972 | Morrison et al. | 428/375 X |
| 3,672,947 | 6/1972 | Luscher et al. | 28/247 X |
| 3,730,137 | 5/1973 | Luscher et al. | 28/271 X |
| 3,793,065 | 2/1974 | Morrison et al. | 428/392 |
| 3,829,802 | 8/1974 | Haynes et al. | 65/3.44 |
| 3,887,389 | 6/1975 | Hedden | 106/212 |
| 3,908,351 | 9/1975 | Carroll | 57/297 |
| 3,928,666 | 12/1975 | Morrison et al. | 428/378 |
| 3,946,132 | 3/1976 | Hedden | 428/378 |
| 3,971,871 | 7/1976 | Haynes et al. | 428/378 X |
| 3,999,970 | 12/1976 | Barch et al. | 65/3.1 X |
| 4,003,111 | 1/1977 | Drummond | 57/350 X |
| 4,020,623 | 5/1977 | Drummond | 57/309 |
| 4,143,006 | 3/1979 | Workman | 428/378 X |
| 4,233,046 | 11/1980 | Walser | 428/378 X |
| 4,296,173 | 10/1981 | Fahey | 428/378 |
| 4,397,913 | 8/1983 | Fahey | 428/369 |
| 4,403,744 | 9/1983 | Reese et al. | 242/18 G |

Primary Examiner—John Petrakes
Attorney, Agent, or Firm—Kenneth J. Stachel

[57]  ABSTRACT

Glass fiber strand is prepared from a process so that the strand can be bulked at higher processing speeds. The process involves drawing the glass fibers from molten glass, applying an aqueous treating composition to the fibers, gathering the treated glass fibers into one or more strands and collecting the glass fiber strands onto one or more packages, drying the packages, rewinding the packages onto a second, more supportive package, steaming one or more of the second packages and drying the steamed packages so that the package has a moisture content of around 1 to about 25 weight percent. The aqueous treating composition used to treat the glass fibers in forming has one or more starches, an aqueous soluble, emulsifiable or dispersible wax wherein the amount of wax in the aqueous treating composition is less than the amount of starch, a cationic lubricant and water. The first drying step is conducted at a temperature to remove moisture from the first package so that the treating composition forms at least a partial coating on the fibers. The steaming step is conducted at a temperature above the melting point of wax, generally above about 145° F. (63° C.). The steamed and dried glass fiber strand yarn, whether twisted or untwisted, can be processed in bulking operations at speeds in excess of 600 yards per minute (1800 feet per minute) up to around speeds of 1,000 yards per minute (3,000 feet per minute) with reduced sloughing of the yarn which occurs as the yarn is pulled from the supply package into the bulking operation.

20 Claims, No Drawings

PROCESS FOR PRODUCING TREATED GLASS FIBER STRANDS FOR HIGH SPEED BULKING

The present invention is directed to a process for producing treated glass fiber strands and to said treated strands that can be bulked at high processing speeds.

Glass fibers are produced from molten streams of glass from small orifices in a bushing of a melting furnace. These fibers are treated with a surface chemical treatment and combined in one way or another to produce glass fiber strands. For textile application, the glass fiber strands can be formed into a yarn by twisting just one strand or by twisting or by plying more than one strand together simultaneously. In addition to standard twisted and plied glass fiber strand yarn products, a demand has been growing for a product which can replace asbestos in textile uses. A good replacement product is the bulked glass fiber strand yarn.

Bulked glass fiber strand yarn can be produced in single and/or multiple end varieties, and the bulked yarn includes such yarns as texturized yarns and slubby-type yarns. Generally, the bulked, texturized or slubby yarns consist of glas fiber strand or strands that have been subjected to considerable agitation as yarns to disturb the filaments within the strands so as to reduce the adherence between the filaments of the strands. These bulky yarns have a linear core portion with surface, closed or crunodal loops of various size and distribution depending upon the extent of the disturbance of the filaments and/or strands in the yarn. The bulked yarns may appear to have uniform areas of bulkiness or may have intermittent areas of increased bulkiness or numbers of closed loops or texturizing. The bulked yarns can be produced from basic twisted yarns and from one or more untwisted glass fiber strands. The untwisted glass fiber strand or strands processed into bulked glass fiber strand yarn also imparts a temporary or false twist to the bulked glass fiber strand yarn and product.

An example of such a bulking process to produce bulked glass fiber strand yarn is referred as air-jet texturizing. This process involves filaments or strands being fed at a faster rate than the rate of removal from texturizing into a rapidly moving gaseous stream, usually an air stream, at the necked region of a nozzle. Downstream from the entry of the filaments or strands into the nozzle the channel widens, and this causes a turbulent air flow which results in the loops and entanglements of the filaments in the overfeed strands and the strands themselves. After the strands are removed from the bulking device, a chemical treatment is usually applied to the bulked glass fiber strand yarn. The treated bulked glass fiber strand yarn is then collected. Examples of such a bulking process are shown in U.S. Pat. Nos. 3,672,947 and 4,003,111. Other bulking processes include edge crimping and gear crimping.

The bulked yarn product has good resistance to extension, and therefore, has found application in fabrics that require dimensional stability, considerable opacity and improved surface fuzz. Generally, the bulked yarn product can be used in knitting, weaving, braiding or pleating. An example of such a bulked glass fiber strand yarn is available from PPG Industries, Inc. under the LEX ® trademark for a single end bulked yarn product and under the TEXO ® trademark for a multi-end bulked yarn product. Particularly, the yarns have found utility in thick fabrics, lagging fabrics, welding curtains, safety blankets, stress relieving blankets, tapes, braids, ropes, cords, wicks, bulked fillers, filtration cartridges, thermal insulation, packing and gaskets and plastic laminates.

The sized glass fiber strands that have been used in the bulking process have been those having a dried residue of a starch oil sizing composition present on the glass fibers which made up the glass fiber strand. In processing these glass fiber strands in the bulking operation, the maximum speed of the strands through the bulking process was around 600 yards per minute. When higher speeds were attempted, the yarn being pulled from a supply package of the sized glass fiber strand led to sloughing of the strands coming from the package. Sloughing is a condition where the strands wound in the package become loose and fall off the wound package. The sloughing strands can cause snags and possibly breakage of filaments and strands entering the bulking process and possibly stop the bulking process altogether.

There is a need in the art for a sized glass fiber strand product and a process for producing the product, where the sized glass fiber strand can be used in a bulking operation at strand speeds greater than 600 yards per minute. Myriad economic and process advantages would be realized in breaking the speed barrier of 600 yards per minute in the processing of strand through a bulking operation.

It is an object of the present invention to provide a process for producing sized glass fiber strand product that can be used in a bulking operation to produce bulked glass fiber strand yarn at speeds greater than 600 yards per minute.

It is a further object of the present invention to provide a sized glass fiber strand product that is useful in a bulking operation to produce bulked glass fiber strand yard at speeds greater than 600 yards per minute.

SUMMARY OF THE INVENTION

The foregoing objects and additional objects gleaned from the following disclosure are achieved by the process and product of the present invention.

In its broadest aspects the process of the present invention involves drawing glass fibers from molten cones of glass, applying to the fibers an aqueous treating composition, gathering the fibers into one or more strands, collecting the one or more strands into one or more packages, drying the one or more packages, rewinding the one or more strands from the first package onto a second package that provides more support for the coiled wound strands, steaming one or more of the packages and drying the steamed package or packages. In this process, the aqueous treating composition applied to the fibers has one or more starches, one or more aqueous soluble, emulsifiable or dispersible waxes having a melting point of at least around 100° F. (37.8° C.), and one or more cationic lubricants and water. The amount of the wax is less than the amount of starch present in the aqueous composition. The amount of water in the aqueous composition is that to give a total solid content of the composition in the range of about 1 to about 20 and preferably about 1 to about 10 weight percent. The steaming is conducted at a temperature in the range of about 150° F. (65° C.) to about 212° F. (100° C.). The drying step after the steaming step is accomplished at a temperature sufficient to remove about 2 to about 3 percent of the moisture from the steamed rewound packages.

A narrower aspect of the present invention is an aqueous treating composition for treating glass fibers. The composition consists essentially of one or more starches, an aqueous emulsion of one or more waxes having a melting point of less than about 100° F. (37.8° C.), along with one or more nonionic emulsifiers to give a total HLB in the range of about 8 to about 12, wherein the amount of the emulsion present in the aqueous treating composition is less than an amount which would yield an amount of wax equal to or in excess of the amount of starch in the aqueous treating composition, and a cationic lubricant and water to give a solids content for the emulsion in the range of about 1 to about 20 weight percent and preferably about 1 to about 10 weight percent. A further narrower aspect of the present invention is treated glass fiber strands of the aforedescribed treating composition, wherein the strands have an amount of the treating composition less than 1.2 weight percent based on loss on ignition (LOI).

The sized glass fiber strand product of the present invention is the product of the aforedescribed process present in a coiled, wound multilayered supported package with overlapping layers. The supported package can be used in any bulking operation and the sized glass fiber strand or strands are removed from the package with minimal sloughing even at speeds of around 900 yards per minute or greater. These sized glass fiber strands allow the production of bulked glass fiber strand yarn at speeds in excess of 600 yards per minute.

DETAILED DESCRIPTION OF THE INVENTION AND PREFERRED EMBODIMENT

The process of the present invention involving the aqueous treating composition and the treated glass fiber strands of the present invention results in a glass fiber strand product that can be bulked in a high speed bulking operation with minimal sloughing of the strand as it is removed from the supply package and fed into the bulking operation. In the past, the speed of the bulking operation has been conducted at 600 yards per minute (1800 feet per minute). At this speed the exposure of the strand to the fluid turbulence in the bulking jet, preferably pressurized air in an air jet, has just the right balance of exposure time versus air pressure to adequately bulk the strand or strands without severely reducing the tensile strength of the strand. The treatment in the jet can reduce the tensile strength of the strand due to the strand being blown apart by the air pressure causing breakage of filaments and possibly the strand if the air pressure or exposure time is too great. In increasing the speed of the bulking operation, the strand or strands being pulled from the supply packages which are usually bobbins tends to be loosened more than when the bulking operation is conducted at a lower speed. The increased force upon the strand being removed from the package engenders this loosening of strand prior to feeding the strand into the bulking operation, and the strand sloughs on the package causing entanglements of the strands as it is eventually pulled from the package.

In the process of the present invention, the aqueous treating composition and the treated glass fiber strands allow the operation of the bulking process at speeds in excess of 600 yards per minute (1800 feet per minute). The process of the present invention must be conducted at this higher speed, since longer exposure times of the strand in the bulking jet could be detrimental to the tensile strength of the bulked strand. The speed at which the bulking operation is run with the glass fiber strand product produced in accordance with the process of the present invention with the aqueous treating composition and treated glass fiber strands is in excess of 600 yards per minute and up to around 900 to 1,000 yards per minute (2700 to 3000 feet per minute).

The process of the present invention involves forming glass fibers from molten streams of glass by attenuating the glass fibers through small orifices in a bushing. The fibers are attenuated by a winder, and as they are attenuated, the fibers are drawn across an applicator, for example, a belt applicator, a roller applicator, or the like where a chemical treating composition is applied to the fibers. The fibers are then gathered usually by a gathering shoe mechanism into one or more unitary glass fiber strands. The glass fiber strands may be drawn at speeds of from about 2500 to greater than 1,000 feet per minute or more (762 to 5,486.4 meters per minute or more). The strand passes across a spindle and is wound on a winder mechanism into a forming package on the mandrel of a winder. Such a process is illustrated in U.S. Pat. No. 3,999,970 (Barch et al.) at FIG. 1 which is hereby incorporated by reference. Also, any other method known to those skilled in the art for forming glass fibers, treating glass fibers with an aqueous composition and gathering the glass fibers into one or more strands and collecting the strands onto a forming package or roving package can be used.

The aqueous treating composition of the present invention used to treat the glass fibers when they are formed need only have the following components, one or more starches, one or more water soluble, emulsifiable, or dispersible waxes, a cationic lubricant and water. The aqueous composition cannot have a hydrocarbon oil type lubricant, because the lubricant would not perform its function adequately within the process and is detrimental to the extent that the resulting bulked glass fiber strand would have increased fluffiness. Also, the wax is essential to the aqueous treating composition because of the melting character and film forming character of the wax. Wax is a fast melting material which actually changes state from the solid to the liquid state in melting, rather than merely undergoing a modulus change as some thermoplastic materials do when they pass through the glass transition temperature or softening point temperature.

The starch component of the aqueous treating composition of the present invention is incorporated to provide a film forming character and to bind the glass fibers together into a strand in order that the strand will have enough integrity to withstand subsequent processing steps. The starch component can be any water soluble starch such as dextrin, and any water insoluble starch, such as amylose, and the starch can be from the commercially available starches such as those derived from corn, potato, wheat, sago, tapioca and arrow root which can be modified by crosslinking. The crosslinking modification may be carried out by any conventional method known to those skilled in the art. The starch can contain any percentage of amylose starch and any percentage of amylopectin starch that are known to those skilled in the art. The starch may be a low amylose starch which is a water repellant starch that contains from 25 to 27 percent amylose with the remaining being amylopectin starch. The low amylose starch contains cross-links and is preferably a lightly cross-linked corn starch. Also, considered to be included for the purpose of this invention are starch mixtures containing a low amylose component and a high amylose component that are lightly crossbonded to each other to provide a weak knit. Examples of such a starch mixture ae given in U.S. Pat. No. 3,227,192 hereby incorporated by reference. The preferred starch is a high amylose potato starch which is cross-linked with epichlorohydrin and available from National Starch under the trade designation National 1554.

The preferred starch is characterized by unusually high film strength and flexibility that has a Brabender viscosity of 9.5 percent solids (dry). It has a gel temperature minimum of 67° (with a peak of 400 Brabender units) and a gel temperature maximum at 73° C. and a peak of 700 Brabender units.

The cross-linked starch can be prepared for the aqueous sizing composition by partial cooking or gelatinization by mixing the starch with water in a main mix tank with good agitation and heating the mixture while agitating and then cooling the mixture by addition of water. In the present invention, it should be noted that the term cooling is intended to note particle breakdown with attendant conversion of the material to the form of a solution. It is preferred to partially cook and cross-link the starch by adding the starch to water and heating the mixture in a jet cooker at a temperature in the range of about 220° F. (104° C.) to about 250° F. (121° C.) at a pressure in the range of about 40 psi to about 45 psi. Any temperature and pressure equivalent to these temperatures and pressures can be used. The amount of the cross-linked partially cooked starch present in the treating composition is in the range of about 50 to about 70 weight percent based on the nonaqueous components of the composition. Based on the aqueous components of the composition, the amount is in the range of about 1.5 to about 3 weight percent. Preferably, the amount of the starch in the aqueous treating composition is in the range of about 1.7 to about 2.3 weight percent. The preferred starch mixture that can be used is about 40 percent water insoluble after cooking.

The aqueous treating composition also has a wax component which can be any suitable water soluble, emulsifiable or dispersible wax selected from the group consisting of dextrins, vegetable waxes, such as carnauba, Japan bayberry, candelilla and the like; animal waxes such as beeswax, Chinese wax, hydrogenated sperm oil wax, and the like; mineral waxes such as ozocerite montan, ceresin and the like; and synthetic waxes such as polyalkylenes like polyethylenes, polyethylene glycols, polyethylene esters, chloronanapthalenes, sorbitals, polychlorotrifluoroethylenes; petroleum waxes such as paraffin, microcrystalline waxes and the like, where these waxes have a melting point of at least 100° F. (37° C.). The wax has a dual function in that it acts as an external or dry lubricant for the glass fibers allowing the glass fibers to endure the abrasion caused by the subsequent processing steps such as winding and gathering, twisting and bulking without breaking the glass fibers. Also, the wax functions to melt when contacted by steam to flow from strand to strand in a coiled package that is being steamed and form a film from strand to strand after the coiled package is dried and cooled after steaming. The amount of the wax in the aqueous sizing composition of the present invention is always less than the amount of starch and is generally in the range of about 0.1 to 1.5 weight percent of the aqueous treating composition and in the range of about 3 to about 35 weight percent of the solids of the aqueous treating composition.

Any wax that is insoluble or immiscible in water to any degree must be added to the aqueous treating composition as an emulsion or dispersion. It is preferred that the wax is emulsifiable in water like a paraffin wax. The preferred paraffin wax is a paraffin wax having a melting point from around 120°-127° F. (50°-53° C.). The emulsifier system used in emulsifying the wax for addition to the aqueous treating composition of the present invention is important because an acceptable stability of the treating composition must be achieved. The aqueous emulsion can be made with any one or more nonionic, anionic or cationic emulsifiers known by those skilled in the art to be useful in forming an aqueous emulsion of a wax. A particularly useful emulsifying system for a water insoluble wax is a dual emulsifying system. One emulsifier is a sorbitan monostearate and the other emulsifier is a polyoxyethylene sorbitan monostearate wherein one emulsifier has an HLB as low as about 4.5 and the other emulsifier has an HLB as high as about 15. The amounts of the two emulsifiers used in the aqueous sizing composition are those amounts to give an HLB for the emulsifying system between about 8 and about 12. Particularly suitable emulsifiers for the preferred wax used in the aqueous sizing composition of the present invention has been found to be the sorbitan monostearate available as "AHCO 909" with an HLB of 4.7 and "AHCO-DFS-149" a polyoxyethylene (20) sorbitan monostearate with an HLB of 14.9. Both of these products are commercially available from ICI Americas Inc. The amount of the emulsifiers used in the sizing composition should be at least 0.1 part per part of wax, and preferably is in the range for the total amount of both emulsifiers from about 0.1 to about 0.2 parts per part of wax or about 2.5 to about 5.5 weight percent of the solids in the composition and most preferably around 1 part of emulsifiers for 5 parts of wax. Although it is preferred that the emulsifier system is comprised of the two emulsifiers as those mentioned above, it is within the scope of the present invention to have an emulsifier system with more than two emulsifiers as long as the emulsifier system has an HLB in the range of about 8 to about 12 and preferably in the range of about 8 to about 10.5.

The HLB is an expression of the relative simultaneous attraction of an emulsifier for water and for oil or for the two phases of the oil-in-water emulsion system being considered. It would appear to be determined by the chemical composition and extent of ionization of a given emulsifier.

In addition to the starch and the wax emulsion, the aqueous treating composition also has present a cationic lubricant or textile softener to provide a softening action to the treated glass fibers. Typical cationic lubricants or softeners are alkyl imidazoline derivatives such as those described in U.S. Pat. Nos. 2,200,815; 2,267,965; 2,268,273; 2,355,837; which are hereby incorporated by reference. The material designated "Cation-X" ® is an example of such a material, wherein the alkyl imidazoline derivative is the reaction product of the stearic acid, tetraethylene pentamine and acetic acid. Acid solubilized, water dispersible, stearic amides and anhydrous acid and the solubilized, water dispersible low molecular weight fatty acid amides as well as anhydrous acid, solubilized polyunsaturated low molecular weight fatty acid amides can also be used as the cationic lubricant. The amount of the cationic lubricants used in the aqueous treating composition of the present invention is in the range of about 0.10 to about 0.30 weight percent of the aqueous treating composition and on a nonaqueous basis, the amount of the cationic lubricant is in the range of about 3 to about 14 and more specifically, from about 4 to about 8.

Additional ingredients can be used in the aqueous treating composition such as those known by those skilled in the art for use in aqueous treating compositions for glass fiber, where these ingredients are not very sensitive to changes in humidity conditions and temperature conditions. Several examples of such agents include: wetting agents like IGEPAL 630 polyethylene glycol and additional dry lubricants.

The aqueous treating composition of the present invention also has a small amount of fungicide and/or bactericide to deter the growth of fungi and/or bacteria in the treating composition due to the presence of the starch. Any fungicide or bactericide known to those skilled in the art may be used, such as, one of the organo-metallic quaternary type fungicides such as tributyltinoxide. The fungicide or bactericide is usually employed in sufficient amounts to prevent mold attack or growth on the amylose containing starch derivative. Suitable effective amounts of the fungicide are those equivalent to about 3 milliliters for every 75 gallons of the aqueous treating composition. The amount of fungicide can be varied depending on the amount of the starch used in the aqueous treating composition to function effectively as a mold and fungi suppressant.

The glass fibers treated with the aqueous treating composition and formed by the aforedescribed steps can have any filament diameter commercially available and can be made from any glass batch material known to those skilled in the art to produce glass fibers. Examples include "621" type glass and "E-glass" and more environmentally acceptable derivatives thereof such as no or low boron and no or low fluorene containing glass batch compositions.

The aqueous treating composition of the present invention can be prepared by any method known to those skilled in the art for preparing stable sizing compositions having starch as a component. Preferably, the treating composition is formed by cooking the starch as aforedescribed, preparing the emulsion by weighing the preferred wax, which is paraffin wax with a melting point of around 123° F. to 127° F. and by melting the wax preferably at a temperature of around 150° F. (66° C.). After melting hot water at a temperature of around 180° F. (82° C.) it is slowly added to an Eppenbach mixing vessel containing the melted paraffin wax and emulsifiers. The water is added at approximately a 5 to 1 ratio of the materials in the Eppenbach mixing vessel and agitation is continued for about 25 minutes. Also, the cationic lubricant is dissolved in hot water around 145° F. (63° C.) with agitation. Then the emulsion of the wax is added to the starch slurry at a temperature of around 150° F. (66° C.) and the cationic lubricant is also added. Finally, the fungicide is added to the mixture. The aqueous treating composition preferably has a viscosity of about 7.5±15 centipoise, a pH of 6±0.5 and an emulsion particle size of 0.25 to 1 micron. The solids of the aqueous treating composition preferably range from 3 to 4 weight percent and the temperature of the aqueous treating composition is kept at 140° F.±5° F. (60° C.±5° C.).

The aqueous treating composition is applied to the glass fibers in such a manner that the amount of aqueous treating composition present in the gathered glass fibers or strand ranges from about 0.1 to about 1.2 and preferably less than 1.0 weight percent based on loss on ignition (LOI). The loss on ignition test is a well known technique for determining the amount of coating on glass fibers. It involves weighing the coated glass fiber strand and then burning the coating off the glass fiber strand to determine the weight of the strand without the coating. Then the weight percent of the coating is based on the weight of the coating itself divided by the weight of the coated glass fiber strand times 100. This analytical technique does not constitute a process step in using the sized glass fiber strands of the present invention. The treated glass fiber strand of the present invention has sufficient integrity to be supplied to a bulking operation. A sufficient amount of integrity must be provided to enable the strand or strands to be easily removed from the packages containing the strands for conveyance into the bulking operation. The amount of the strand or strands removed from one or more of the strand-containing packages without breaking is referred to as the payout of the package. While the dried residue of the aqueous treating composition on the fibers within the strand performs this function, it also performs another function that is diametrically opposed to this first function. The dried residue of the aqueous treating composition permits the sized dried glass fiber strands to come apart to a degree into the individual fibers or filaments, when the strand or strands or yarn is contacted with a separating force such as fluid turbulence like the air in an air jet. This type of separating force is that which is employed in the bulking operation to cause the separate fibers to form crunodal loops in the yarn, as is well known to those skilled in the art.

The treated glass fiber strand of the present invention after being formed is present on a forming package and forming packages are dried individually or as a plurality in a drying oven. The oven temperature is any temperature that is sufficient to reduce the moisture level of the forming package to result in a coating of the treating composition on the glass fibers. The temperature can not be too high as to have any degradation effects on the coating. The time of drying varies from about 8 to 24 hours depending on the temperature of drying so that higher temperatures have lower times and conversely. Preferably, the temperature of the drying operation is around 180° F. (82° C.) for around 14 hours at around 28 pounds vacuum. Also, the drying can take place at ambient temperature of around 70° F. to about 85° F., preferably 75° to 81° F. for a period of time from around 12 to 24 hours at a relative humidity of around 40 to around 50 percent. The strand or strands can even be dried at ambient conditions while they are being rewound onto a second package which provides more support to the coiled layered glass fiber strands.

The treated glass fiber strands on the forming package, whether wet or dried can be rewound onto a second more supporting package; for example, a bobbin. The rewinding can be accomplished with or without placing a twist in the strand or strands being rewound. An example of rewinding the strands without twisting is disclosed in U.S. patent application Ser. No. 297,603, filed Aug. 31, 1981, now U.S. Pat. No. 4,403,744, entitled "Method and Apparatus for Controlling Strand Tension" (Reese and Walker) and assigned to the assignee of the present patent application. Also, the forming packages can be rewound onto the second package in a twisting operation. This is accomplished by placing a plurality of the wet or dried forming packages at a plurality of stations on a twist frame machine, well known to those skilled in the art. On the twist frame, preferably the dried glass fiber strands are removed from the forming package and rewound onto a bobbin. Here the rewinding places a twist in the glass fiber strand. It is preferred that the glass fiber strands be rewound by twisting, where a one-half twist is placed on the strands.

The bobbins of rewound glass fiber strand are tightly wound coiled and layered packages of twisted or untwisted glass fiber strand. One or a plurality of these second packages are steamed in a steaming device. The steaming operation occurs at a temperature in the range of about 150° F. to around 212° F. (66° C. to 100° C.) or superheated steam can be used. The time of treatment is at least sufficient to melt a substantial portion of the wax present in the coating on the glass fibers, but not too long so that too great an amount of moisture will have to be removed later from the steamed packages. Preferably, steaming occurs in the range of about 45 to about 200 minutes.

The steaming operation is conducted most preferably at a dried bulb temperature of 150° F. (66° C.) and a wet bulb temperature of 145° F. (63° C.) at a relative humidity of around 88 percent. The time of treatment is around 15 minutes for preheating the steamer and 90 minutes for steaming. Any steaming equipment or device known to those skilled in the textile art can be utilized in the process of the present invention. An example of a particularly suitable steaming device is that available under the trade designation HW conditioner type FT-3 number FO-4694 made by Industrial Dryer. Inc., Gastonia, N.C. Such a steaming device is approximately 20 feet long and 15 feet wide and 10 feet high and can accomodate several hundred bobbins at one time.

The advantage of steaming is that it melts the wax present on the fibers of the rewound package and the wax flows to adjacent strands in one coiled and layered package. Since the wax is a quick melting material that actually changes states from the solid to the flowable liquid rather than merely having a modulus change such as a thermoplastic material passing through a glass transition temperature or softening point, the wax present even on the fibers on the inside of the tightly coiled and layered package is melted and flows to adjacent coiled and layered strands. This allows for a slight adhesion between the coiled and/or layered strands of the package from the outer surface of the package even to the inner surface of the package. Such a slight adhesion between the strands reduces the sloughing of the strands as the strands are withdrawn from the package from the outer area to the inner area of the package. The steaming in conjunction with the dried treating composition on the fibers in the glass fiber strands provides a synergism, which enables the reduction of sloughing of the strand as it is withdrawn from the package.

After steaming, the package of glass fiber strands is dried to remove enough moisture so that the final dried package has a moisture content of about 0.1 to about 2.0 weight percent and preferably around 0.2 to about 0.5 weight percent. Preferably, the drying step is performed at a temperature of around 120° F. to 180° F. and for a time of around 5 to 30 minutes, preferably around 15 minutes.

This package produced by the process of the present invention has the slight adhesion between the coiled and/or layered strands due to the melting and upon drying, the resolidification of the wax in the treating composition present on fibers within the strand. This package can be used in any bulking process known to those skilled in the art for single end yarn production or multi-end yarn production. The wax adhesion between the coiled and/or layered strands is not too high so as to retard the payout of the strand from the package into the bulking operation. Preferably, before the packages are texturized, if they have to be stored, they are stored at conditions of relative humidity of around 40 to around 50 percent. An example of a suitable texturizing process in which the strand of the present invention can be used in a texturizing process disclosed in U.S. Pat. No. 3,672,947 and 3,730,137 (Luscher), hereby incorporated by reference. Such a texturizing process can be run at speeds in excess of 600 yards per minute (1800 feet per minute) and up to speeds of 1,000 yards per minute (3,000 feet per minute).

The present invention is further illustrated by the following examples.

Table I presents data on three illustrative examples of aqueous treating compositions not within the scope of the present invention and six aqueous treating compositions according to the present invention. Illustrative example 1 is an aqueous treating composition used to treat glass fibers in preparing commercial texturized glass fiber strand yarn. Illustrative example 2 is a treating composition having more wax than starch in the aqueous treating composition. Illustrative example 3 does not contain wax in the treating composition. Glass fiber strand treated with the aqueous treating compositions of illustrative examples 1, 2 and 3 did not perform satisfactorily in texturizing at higher speeds as is shown in the results of Table II. Glass fiber strands treated with the aqueous treating compositions of examples 1 through 6 were able to be texturized at speeds up to 1,000 yards per minute (3,000 feet per minute).

Table II shows results of glass fibers and strands treated with the various treating compositions of the illustrative examples and treating compositions of the examples of the present invention. The glass fiber strand was G-37 single end strand with a 0.5Z twist. Table II indicates by an indication of "ok" whether performance was satisfactory for the forming of the glass fibers into strands, drying of the glass fiber strands, twisting of the glass fiber strands, and texturizing of the glass fiber strands. The texturizing was performed in the same manner and with the same materials for each example. From the results of Table II, it is shown that the glass fiber strand of illustrative examples 1, 2 and 3 could not be processed in the texturizing operation at speeds greater than 600 yards per minute (1800 feet per minute) and glass fiber strand made with the treating compositions and process used for examples 1 through 6 could be processed in texturizing at speeds of around 1,000 yards per minute (3,000 feet per minute). The results of Table II also indicate that illustrative example 2 where the treated strand had a greater amount of wax than the amount of starch could not be dried satisfactorily. Also, the glass fiber strand treated with the aqueous composition in accordance with illustrative example 3 having no wax could not be satisfactorily texturized even at 600 yards per minute. The indication of satisfactory processing at the various speeds of texturizing by the use of the term "OK" is an indication of performance including reduced sloughing upon removing the glass fiber strand yarn from the supply package into the texturizing operation.

TABLE I (in grams for 20 gallon mix)

| Ingredients | Illustrative Examples 1 | 2 | 3 | Examples 1 | 2 | 3 | 4 | 5 | 6 |
|---|---|---|---|---|---|---|---|---|---|
| Cato-75 (cationic starch) | — | — | — | — | 1600 | — | — | 1600 | — |
| National 1554 (potato starch 50/50) | 2204 | 800 | 1600 | — | — | 1600 | — | — | 1600 |
| Amaizo 213 (corn starch 50/50) | 390 | — | — | — | — | — | — | — | — |
| Nadex 3999 (Dextrin) | — | — | — | 1600 | — | — | 1600 | — | — |
| Paraffin Wax | — | 1600 | — | 800 | 800 | 800 | 800 | 800 | 800 |
| Emerset 2640 Emulsifier (polyethylene glycol monostearate) | — | 250 | 150 | 150 | 150 | 150 | 150 | 150 | 0 |
| AHCO-909 Emulsifier (sorbitan fatty acid ester stearate) | — | — | — | — | — | — | — | — | 50 |
| AHCO-DFS-100 Emulsifier (polyoxyethylene sorbitan fatty acid ester stearate) | 122 | — | — | — | — | — | — | — | 50 |
| DGS (diethyleneglycol monostearate) | 48 | — | — | — | — | — | — | — | — |
| Soybean oil | 986 | — | — | — | — | — | — | — | — |
| Carbowax 300 (ethyleneglycol polymer) | 410 | — | — | — | — | — | — | — | — |
| Cation-X: (alkylimidazoline-reaction product of tetraethylene pentamine and stearic acid) [wet lubricant] | 354 | 300 | 300 | 300 | 300 | 300 | 300 | 300 | 144 |
| Igepal CA-630: octylphenoxy poly (ethyleneoxy) ethanol [wetting agent] | — | 15 | — | — | — | — | — | — | — |
| SAG-10 | — | 1 | — | — | — | — | — | — | — |
| Biomet 66 Biocide | 1 | 1 | 1 | 1 | 1 | 1 | 1 | 1 | 1.4 |
| Viscosity at 140° F. cps | 15 | 6.5 | 7.5 | 5.0 | 7.5 | 7.5 | 5.0 | 5.0 | 7.5 |
| Solids percent | 5.6 | 3.8 | 3.2 | 3.5 | 3.6 | 3.8 | 3.6 | 3.6 | 3.4 |
| pH | 6.4 | 6.5 | 6.7 | 6.9 | 6.8 | 6.7 | 6.9 | 6.9 | 6 |
| Emulsion particle size | >4 | >1 | | >1 | >1 | >1 | >1 | >1 | |

TABLE II

| Type of Evaluation* | Ill-1 | Ill-1 | Ill-2 | Ill-3 | 1 | 2 | 3 | 4 | 5 | 6 |
|---|---|---|---|---|---|---|---|---|---|---|
| Forming | OK | OK | OK | OK | OK | OK | OK | OK | OK | OK |
| Drying | OK | OK | NS | OK | OK | OK | OK | OK | OK | OK |
| Twisting | OK | OK | | OK | OK | OK | OK | NO TWIST | OK | OK |
| Texurizing (no sloughing) at 600 yds/min. | OK | OK | | NS | OK | OK | OK | OK | OK | OK |
| at 750 yds/min. | NS | NS | | | OK | OK | OK | OK | OK | OK |
| at 900 yds/min. | | | | | OK | OK | OK | OK | OK | OK |
| at 1,000 yds/min. | | | | | OK | OK | OK | OK | OK | OK |
| Instron yarn tensile **lbs. | 8.1 | 8.7 | | | 11.6 | 12.6 | 11.8 | 10.5 | 12.3 | 10.5 |
| LOI binder % | 1.09 | .96 | | | .66 | .67 | .65 | | .68 | .6 |

NS = Not Satisfactory
* = Approximately 150 lbs. of product per trial was produced and evaluated
** = Evaluation carried out on yarn and fabric produced from LEX at 900 yds/min. speed

TABLE III

| Sample | Pounds Produced | Speed of Texturizing | Forming No.* of Calldowns | Binder Testings Solids % | Binder Testings No. of lbs. produced from bobbins w/steaming | Evaluation of single end yarn at 900 yds./min. Bobbins Sloughing | Tensile lbs. | Thickness Inch |
|---|---|---|---|---|---|---|---|---|
| Ex. 2 | 400 | 900 | 18 | 3.5 | 100 | 2 out of 10 pkgs. | 10.0 | 0.0160 |
| Ex. 2 | 400 | 900 | 18 | 3.7 | 100 | No | 10.3 | 0.0160 |
| Ex. 2 | 400 | 900 | — | 3.7 | No steaming - 100 | 1 out of 10 pkgs. | | |
| Ex. 6 | 400 | 900 | 19 | 3.4 | 200 | 3 out of 10 pkgs. No | 10.5 | 0.0160 |
| Ill. Ex. 1 | 400 | 600 | 17 | 5.8 | 200 | No | 6.9 | 0.015 |

*Based on total 20 forming packages produced/trial

Table III shows results of an evaluation of texturizing single end glass fiber strand yarn of example 2 versus the illustrative example 1, where example 2 is processed at 900 yards per minute and the illustrative example 1 yarn is processed at 600 yards per minute. The table shows that at 900 yards per minute no sloughing was shown with the glass fiber strand yarn of example 2. Table III also indicates the reduced amount of sloughing from the single end glass fiber strand yarn that is treated according to the process of the present invention as opposed to single end yarn which is only dried and not steamed. The third entry in table III for the example 2 product was not steamed and the sloughing increased so that for 20 packages in that run, 10 packages had 1 slough and 10 packages had 3 sloughs. This is opposed to the material that was dried and steamed having no sloughs or a maximum number of sloughs of 2 for 10 packages.

The foregoing has described a process used with an aqueous treating composition on the treated glass fiber strand to produce a treated glass fiber strand product that can be processed at faster speeds in a bulking operation. The product is the result of a synergistic force of the use of a treating composition having specific ingredients including wax and the steaming of the resultant treated glass fiber strands on a supported package.

I claim:

1. Process for producing glass fiber strand that can be bulked at speeds of greater than 600 yards per minute, comprising:
    a. drawing glass fibers from molten cones of glass,
    b. applying to the fibers as they are being drawn an aqueous treating composition having:
        1. one or more starches,
        2. one or more solid aqueous soluble, emulsifiable or dispersible waxes having a melting point of at least 100° F. (38° C.) wherein the amount of the wax in the composition is not greater than the amount of the starch,
        3. cationic lubricant, and
        4. water to give a solids content for the aqueous treating composition in the range of about 1 to about 20 weight percent,
    c. gathering the fibers into one or more strands,
    d. collecting the one or more strands into one or more packages of strand or strands,
    e. drying one or more packages at a temperature to remove a major amount of the water in the package,
    f. rewinding the one or more strands from the first package onto a second package that provides more support to the coiled strands in the package,
    g. steaming one or more of the second packages at a temperature of at least 150° F. (66° C.),
    h. drying the steamed package to remove an amount of moisture so that the package has a moisture content of about 0.1 to about 2.0 weight percent.

2. Process of claim 1, wherein the rewinding is performed on a twisting frame to impart a twist to the strand as it is rewound.

3. Process of claim 2, wherein the first drying step and the rewinding step are performed simultaneously at ambient conditions.

4. Process of claim 1, wherein the starch is a starch mixture comprised of 45 to 55 percent by weight of a high amylose starch component having an amylose content of about 50 to about 60 percent by weight, and 45 to 55 percent by weight of a water repellant low amylose starch component having cross-links therein and having an amylose content of about 20 to about 30 percent by weight.

5. Process according to claim 1, wherein the starch is a potato starch derivative cross-linked by epichorohydrin.

6. Process of claim 1, wherein the wax is selected from the group consisting of paraffin wax, and microcrystalline wax.

7. Process of claim 1, wherein the cationic lubricant is a derivative of an alkyl imidazoline.

8. Process of claim 1, wherein one or more emulsifiers are used to emulsify the wax into an aqueous emulsion where the emulsifiers are selected from the group consisting of nonionic emulsifiers which give the emulsion a total HLB in the range of about 8 to about 12.

9. Process of claim 8, wherein the emulsifier is a mixture of polyoxyethylene sorbitan fatty acid ester and sorbitan fatty acid ester stearate in a ratio of around 1 part of the emulsifiers for 5 parts of the wax.

10. Process of claim 1, wherein the temperature of the first drying step is around 180° F. (82° C.) for 14 hours.

11. Process of claim 1, wherein the second package with better support for the coiled glass fiber strands is a bobbin.

12. Process of claim 1, wherein the steaming is conducted at a temperature of around 145° F. (63° C.) at relative humidity of around 88% for about 90 minutes.

13. Process of claim 1, wherein the second drying step is conducted to yield a package having an amount of moisture in the range of about 0.2 to about 0.5 percent.

14. Process of claim 1, wherein the amount of aqueous treating composition present on the glass fiber strand is in the range of about 0.1 to less than 1 weight percent based on loss on ignition.

15. Process of claim 1, wherein the amount of aqueous treating composition present on the glass fiber strand is in the range of about 0.4 to about 0.6 weight percent based on loss on ignition.

16. Glass fiber strand product of claim 1.

17. Process of claim 1 which includes bulking the dried glass fiber strand.

18. Bulked glass fiber strand of claim 17.

19. Treated glass fiber strand having the dried residue in an amount of about 0.1 to less than 1 weight percent based on loss on ignition of an aquous treating composition consisting essentially:
    a. a starch mixture comprised of 45 to 55 percent by weight of a high amylose content of about 50 to about 60 percent by weight, and 45 to 55 percent by weight of a water repellant low amylose starch component having cross-links therein and having an amylose content of about 20 to about 30 percent by weight,
    b. one or more aqueous soluble, emulsifiable or dispersible waxes wherein the wax has a melting point in the range of about 100° F. (37° C.) to about 150° F. (66° C.), and where the wax is present in an amount less than the amount of the starch mixture,
    c. cationic lubricant, and
    d. water in an amount to give a total solids for the aqueous treating composition in the range of about 1 to about 20 weight percent.

20. Treated glass fiber strand having the dried residue of an aqueous treating composition in an amount of about 0.4 to less than 1 weight percent based on loss on ignition, wherein the treating composition consists essentially of:
    a. starch which is a high amylose potato starch cross-linked with epichlorohydrin,
    b. paraffin wax in an aqueous emulsion formed by an emulsifier system of nonionic emulsifiers wherein the HLB for the system is in the range of about 8 to about 12, and wherein the amount of wax in the aqueous treating composition is less than the amount of starch, c. alkyl imidazoline reaction product of tetraethylene pentamine and stearic acid cationic lubricant and
d. water in an amount to give a total solids for the aqueous treating composition in the range of about 1 to about 20 weight percent.

* * * * *

UNITED STATES PATENT AND TRADEMARK OFFICE
CERTIFICATE OF CORRECTION

PATENT NO. : 4,470,252

DATED : September 11, 1984

INVENTOR(S) : George L. Brodmann

It is certified that error appears in the above-identified patent and that said Letters Patent is hereby corrected as shown below:

Column 14, line 41, delete "aquous" and insert --aqueous--.

Signed and Sealed this

Second Day of April 1985

[SEAL]

Attest:

DONALD J. QUIGG

Attesting Officer    Acting Commissioner of Patents and Trademarks